(12) United States Patent
Trinder, II

(10) Patent No.: US 11,278,112 B2
(45) Date of Patent: Mar. 22, 2022

(54) ANTIMICROBIAL OVERBED TABLE TOP

(71) Applicant: EOS Surfaces, LLC, Norfolk, VA (US)

(72) Inventor: Kenneth G. Trinder, II, Norfolk, VA (US)

(73) Assignee: EOS SURFACES, LLC, Norfolk, VA (US)

(*) Notice: Subject to any disclaimer, the term of this patent is extended or adjusted under 35 U.S.C. 154(b) by 88 days.

(21) Appl. No.: 16/924,429

(22) Filed: Jul. 9, 2020

(65) Prior Publication Data

US 2021/0015251 A1   Jan. 21, 2021

Related U.S. Application Data

(60) Provisional application No. 62/874,103, filed on Jul. 15, 2019.

(51) Int. Cl.

| | |
|---|---|
| *A47B 13/08* | (2006.01) |
| *B32B 21/04* | (2006.01) |
| *B32B 3/30* | (2006.01) |
| *B32B 3/04* | (2006.01) |
| *B32B 7/12* | (2006.01) |

(52) U.S. Cl.
CPC ............... *A47B 13/08* (2013.01); *B32B 3/04* (2013.01); *B32B 3/30* (2013.01); *B32B 7/12* (2013.01); *B32B 21/04* (2013.01); *B32B 2307/7145* (2013.01); *B32B 2479/00* (2013.01)

(58) Field of Classification Search
CPC ..... A47B 13/08; A47B 96/205; A47B 13/086; A47B 23/025; B32B 3/04; B32B 3/30; B32B 7/12; B32B 21/04; B32B 21/14; B32B 2307/7145; B32B 2470/00; B32B 2479/00
USPC .................. 108/153.1, 161, 27, 901, 49, 25
See application file for complete search history.

(56) References Cited

U.S. PATENT DOCUMENTS

| | | | | |
|---|---|---|---|---|
| 4,216,993 | A * | 8/1980 | Shumaker | A47B 13/04 297/158.3 |
| 5,422,155 | A * | 6/1995 | Spence, Jr. | B32B 21/04 428/76 |
| 5,628,853 | A * | 5/1997 | Edwards | A47B 13/086 156/212 |
| 5,804,278 | A * | 9/1998 | Pike | A47B 95/043 428/116 |

(Continued)

FOREIGN PATENT DOCUMENTS

| | | | |
|---|---|---|---|
| DE | 202013104516 | * | 2/2015 |
| FR | 2247054 | * | 5/1975 |

(Continued)

*Primary Examiner* — Janet M Wilkens
(74) *Attorney, Agent, or Firm* — Peter J. Van Bergen

(57) ABSTRACT

An overbed table top includes a monolithic portion and a laminate portion. The monolithic portion has a top surface, a bottom surface, and an edge surface. The bottom surface includes an open cavity where a peripheral region of the bottom surface circumscribes the open cavity. The monolithic portion is an antimicrobial material. The laminate portion is disposed in the open cavity and is coupled to the monolithic portion. The laminate portion includes an exposed layer of a moisture impervious material coupled to a hidden layer of a wood-based material that can support fasteners used to attach the overbed table top to a frame.

18 Claims, 4 Drawing Sheets

(56) References Cited

U.S. PATENT DOCUMENTS

| | | | | |
|---|---|---|---|---|
| 6,142,559 A | * | 11/2000 | Sorel | A47C 7/68 |
| | | | | 297/135 |
| 8,307,769 B1 | * | 11/2012 | Wescott | A47B 3/0912 |
| | | | | 108/27 |
| 2003/0221595 A1 | * | 12/2003 | Reinsch | A47B 3/0912 |
| | | | | 108/91 |
| 2004/0083931 A1 | * | 5/2004 | Gawronski | A47B 23/025 |
| | | | | 108/49 |
| 2005/0277493 A1 | * | 12/2005 | Hendricksen | A63B 67/04 |
| | | | | 473/496 |
| 2005/0284342 A1 | * | 12/2005 | Strong | A47B 13/08 |
| | | | | 108/144.11 |
| 2007/0034119 A1 | * | 2/2007 | Lin | A47B 13/16 |
| | | | | 108/27 |
| 2012/0255466 A1 | * | 10/2012 | Jarnes | A47B 96/18 |
| | | | | 108/152 |
| 2016/0058177 A1 | * | 3/2016 | Calderone | A47B 3/002 |
| | | | | 5/507.1 |
| 2019/0320853 A1 | * | 10/2019 | Scott | A47J 47/005 |
| 2021/0204687 A1 | * | 7/2021 | Haase | A47B 17/003 |

FOREIGN PATENT DOCUMENTS

| | | | | |
|---|---|---|---|---|
| FR | 2700236 | * | 7/1994 | |
| KR | 20080003770 | * | 9/2008 | |
| KR | 20100025700 | * | 3/2010 | |
| KR | 20200107624 | * | 9/2020 | |

\* cited by examiner

ANTIMICROBIAL OVERBED TABLE TOP

Pursuant to 35 U.S.C. § 119, the benefit of priority from provisional application 62/874,103, with a filing date of Jul. 15, 2019, is claimed for this non-provisional application.

FIELD OF THE INVENTION

The invention relates generally to table tops, and more particularly to a hospital's or other health care facility's overbed table top whose primary touch surfaces are biocidal or antimicrobial.

BACKGROUND OF THE INVENTION

Microbes, to include bacteria, fungi, viruses and spores, are readily deposited on hard surfaces. The presence of small amounts of moisture on such surfaces promotes microbe growth. Human or any host contact with such surfaces provides a transmission vehicle for the microbes leading to further deposition, growth, transmission, and, in many cases, human infection.

Microbe growth and transmission are of great concern in hospitals and other health care facilities. In such settings, there is generally an overbed table having a rolling base or support and a table top that can be positioned over a patient while they lie in a bed. An overbed table's top presents a number of hard contact surfaces that caregivers, hospital workers, visitors, and a patient will touch frequently throughout a hospital or health care facility stay. Further, a variety of liquids to include bodily fluids are frequently spilled and/or inadvertently deposited on an overbed table's top. Thus, an overbed table's top is a prime breeding ground for microbe deposition and growth. Since patients are often in a weakened immune state, they are prime candidates for contracting some type of microbe infection. Unfortunately, actively disinfecting contact surfaces of an overbed table's top is a time-consuming process that is often neglected due to cost, forgetfulness, or lack of concern.

SUMMARY OF THE INVENTION

Accordingly, it is an object of the present invention to provide an overbed table top having passive antimicrobial or biocidal properties.

Another object of the present invention is to provide an antimicrobial or biocidal overbed table top that enhances a patient's interaction therewith.

Still another object of the present invention is to provide an antimicrobial or biocidal overbed table top that is functionally operative with existing overbed table frames/bases or supports.

Other objects and advantages of the present invention will become more obvious hereinafter in the specification and drawings.

In accordance with the present invention, an overbed table top includes a monolithic portion and a laminate portion. The monolithic portion has a top surface, a bottom surface, and an edge surface spanning between the top surface and bottom surface. The bottom surface includes an open cavity wherein a peripheral region of the bottom surface circumscribes the open cavity. The monolithic portion is an antimicrobial material. The laminate portion is disposed in the open cavity and is coupled to the monolithic portion. The laminate portion includes an exposed layer of a moisture impervious material coupled to a hidden layer of a wood-based material adapted to support fasteners that are adapted to attach the overbed table top to a frame.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
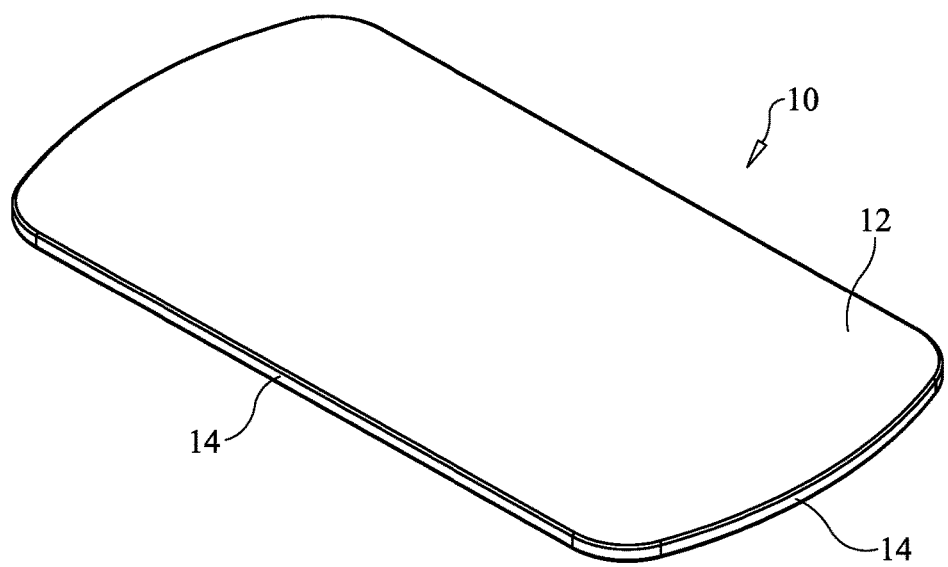
FIG. 1 is a perspective view of the top of an overbed table top in accordance with an embodiment of the present invention.
Figure 2:
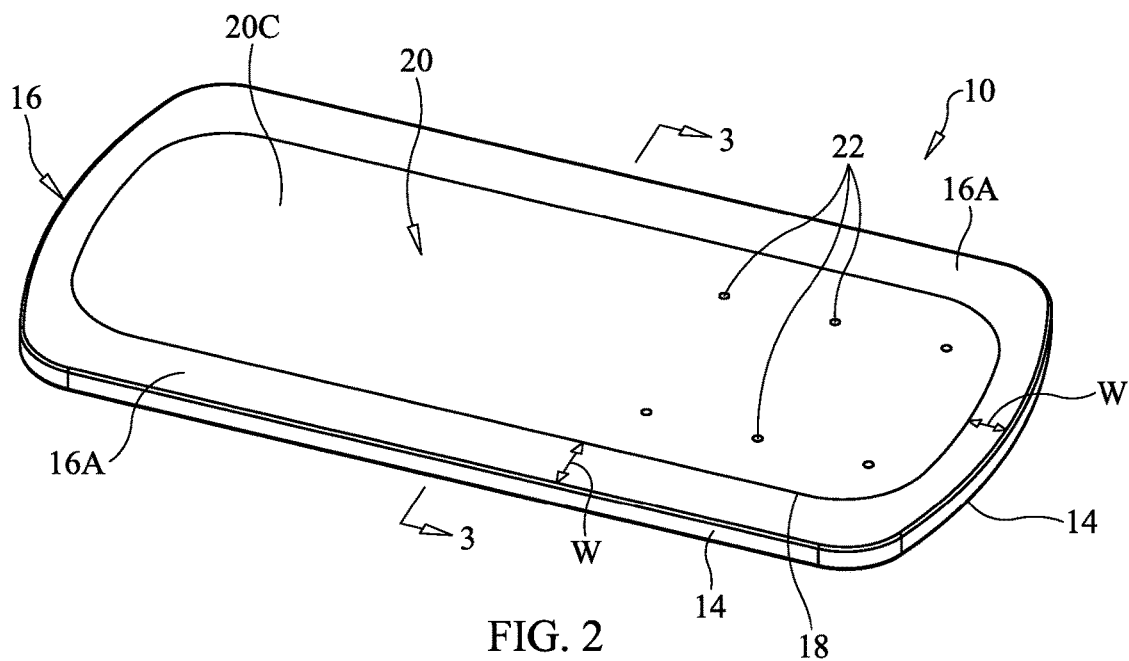
FIG. 2 is a perspective view of the bottom of an overbed table top in accordance with an embodiment of the present invention.
Figure 3:
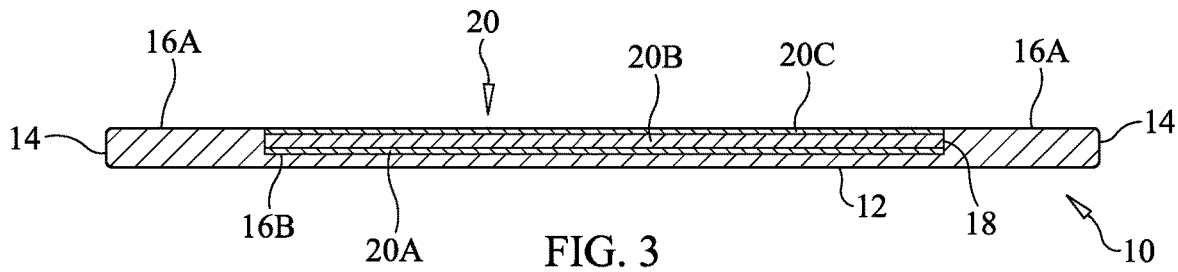
FIG. 3 is a cross-sectional view of the overbed table top taken along line 3-3 in FIG. 2.

Referring now to the drawings and with simultaneous reference to FIGS. 1-3, an overbed table top in accordance with an embodiment of the present invention is shown and is referenced generally by numeral 10. Table top 10 has a generally rounded-corner rectangular shape and is sized to cooperate with a variety of rolling frames/bases or supports (not shown) that facilitate the positioning of table top 10 over a bed used in hospitals and other health care facilities. Such rolling frames/bases or supports are not part of the present invention, are well known in the art, and will, therefore, not be described herein. In the figures, the top of table top 10 is illustrated in FIG. 1, the bottom of table top 10 is illustrated in FIG. 2, and a cross-section of table top 10 is illustrated in FIG. 3.

The readily-touched surfaces of table top 10, as well as those surfaces of table top 10 that are frequently exposed to liquid spills and/or body fluid deposition, are made from an antimicrobial or biocidal material. The relevant surfaces of table top 10 made from an antimicrobial or biocidal material are the entirety of its top surface 12, the entirety of its outer edge surface 14, and the entirety of its bottom surface 16 to include a peripheral surface region 16A circumscribing a surface region 16B of an open cavity 18 at the bottom of table top 10. Outer edge surface 14 spans between the outer periphery of top surface 12 and the outer periphery of bottom surface 16. The width "W" of peripheral surface region 16A should generally be large enough to accommodate the fingertip reach of a user grasping a side of table top 10. In general, width W will be on the order of 2 to 4 inches.

Width W can be the same or varied about the periphery of table top 10 without departing from the scope of the present invention.

In the illustrated embodiment, table top 10 includes a monolithic structure that incorporates top surface 12, outer edge surface 14, and the entire bottom surface 16 to include peripheral surface region 16A. In the illustrated embodiment, the monolithic structure is a solid structure. The material used for the monolithic structure is an antimicrobial and biocidal material such as that disclosed in U.S. Published Application No. 2015/0320035 ("the '035 application" hereinafter), the entire contents of which are hereby incorporated by reference. Briefly, the material disclosed in the '035 application has inherent biocidal properties derived from cuprous oxide which is mixed with a polyester and acrylic polymer along with other additives. While the material disclosed in the '035 application exhibits exceptional antimicrobial properties, the material is a poor receptor of mechanical components such as drill bits, screws, etc.

Open cavity 18 in the bottom of table top 10 receives a mounting laminate 20 that is rigidly coupled to some or all of surface region 16B. Mounting laminate 20 should be readily and securely attachable to an existing rolling frame/base or support (not shown). Typically, attachment of a table top 10 to a rolling base or support is accomplished using screws or bolts designed to pass through a mounting arm of a rolling frame/base or support and then thread into holes 22 provided in mounting laminate 20. The number, size, and arrangement of holes 22 can be other than as shown without departing from the scope of the present invention. Each of holes 22 could be tapped into or could accommodate a threaded insert (not shown) to facilitate coupling of table top 10 to a rolling base or support.

Mounting laminate 20 includes a hidden layer 20A of a pasty adhesive or mastic, a hidden attachment support layer 20B, and an exposed layer 20C of a moisture impervious material whose exposed surface is generally co-planar with peripheral surface region 16A. Layer 20A can be a variety of non-rigid construction mastics or adhesives known in the art. Layer 20B can be a known construction material to include a variety of wood-based materials (e.g., solid wood, plywood, particle board, etc.) that lend themselves to being screw tapped and/or drilled for holes 22. Layer 20C is any conventional moisture impervious material (e.g., thin countertop materials, melamine, paint, etc.) that provides a rigid and cleanable moisture impervious barrier bonded/adhered to layer 20B.

Figure 4:
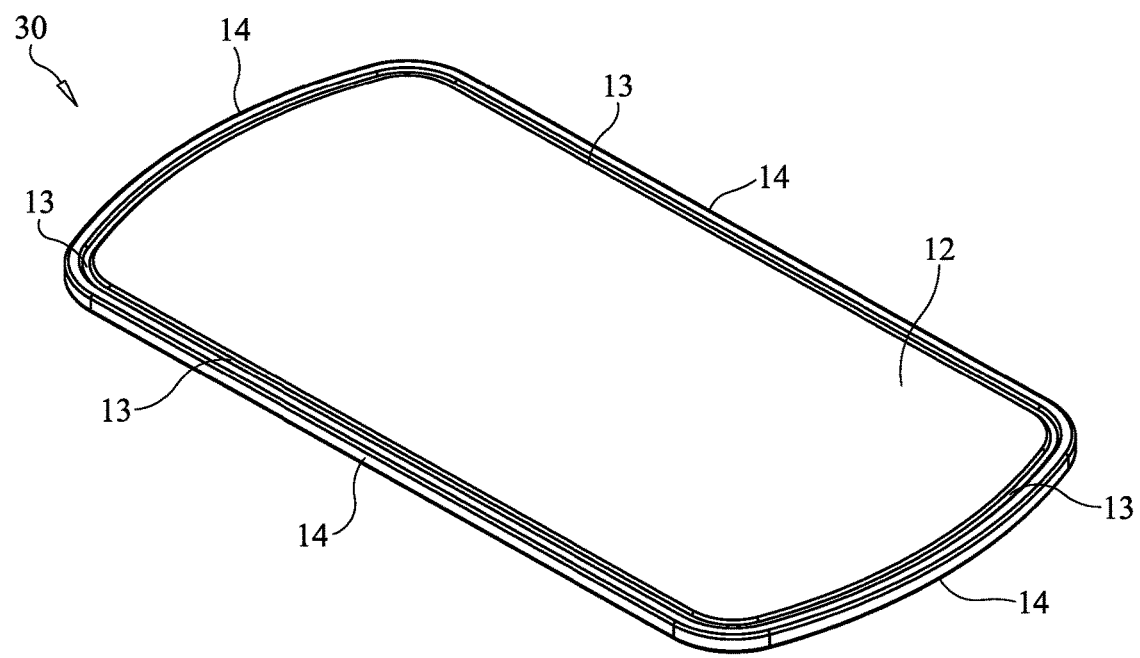
FIG. 4 is a perspective view of the top of an overbed table top in accordance with another embodiment of the present invention.
Figure 5:
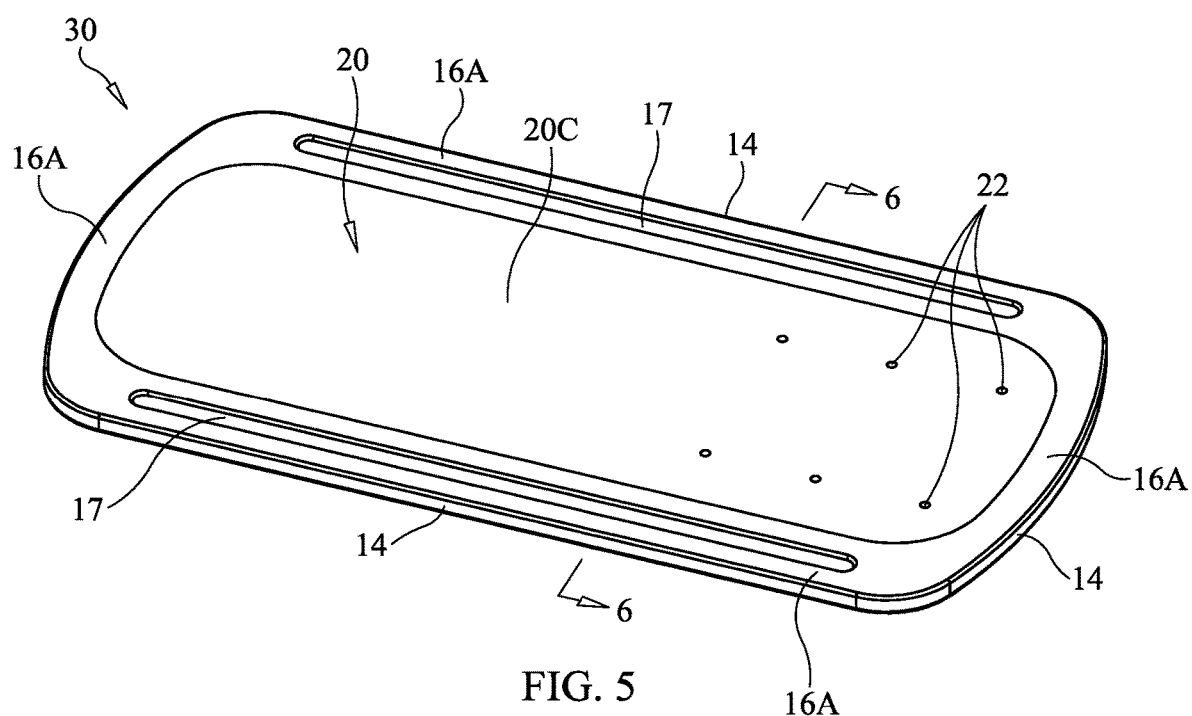
FIG. 5 is a perspective view of the bottom of the overbed table top illustrated in FIG. 4.
Figure 6:
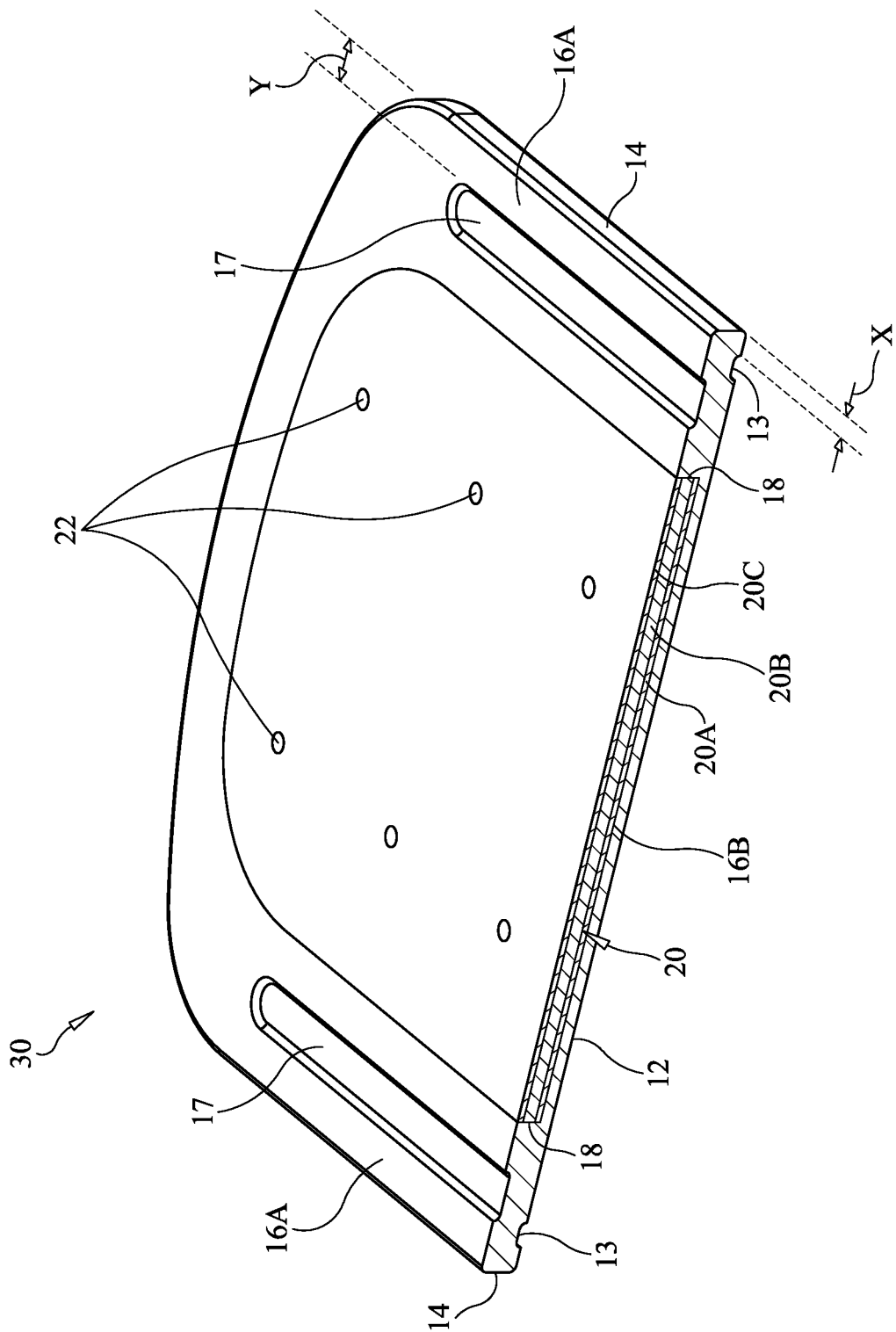
FIG. 6 is a cutaway cross-sectional view of the overbed table top taken along line 6-6 in FIG. 5.

Another embodiment of the present invention will now be explained with simultaneous reference to FIGS. 4-6 where the top of a table top 30 is illustrated in FIG. 4, the bottom of table top 30 is illustrated in FIG. 5, and a cutaway cross-sectional view of table top 30 is illustrated in FIG. 6. The features of table top 30 shared with previously-described table top 10 are referenced using the same numerals used in FIGS. 1-3 and will not be described further herein.

Table top 30 includes additional structural features at its top and bottom to enhance the table top's functionality. More specifically, top surface 12 of table top 30 includes an open channel 13 traversing an annular path all along and just inside the periphery of top surface 12. That is, outer edge surface 14 and open channel 13 are concentric. Open channel 13 is sized to hold a liquid volume (e.g., in a range of 6-14 fluid ounces) such that open channel 13 can hold a volume of liquid equal to or greater than that of typical containers that get placed on an overbed table top to include drinking cups, specimen cups, etc. Open channel 13 also serves as one-half of a unique table top grip system. The second half of the table top grip system is provided by one or two longitudinally-extending open channels 17 traversing a linear path in peripheral surface region 16A along the two long sides of table top 30. More specifically, peripheral surface region 16A includes two parallel regions along the long sides of table top 30, and open channels 17 extend along linear paths that are parallel to portions of open channel 13 at top surface 12.

The beginning of channels 13 and 17 as referenced to the table top's outer edge surface 14 are offset from one another to facilitate gripping of the table top. More specifically, channel 13 begins at a distance "X" from outer edge surface 14 while channel 17 begins at a distance "Y" from outer edge surface 14 where X<Y. Since a user typically grasps table top 30 with their thumb on the top side thereof and one or more of their four fingers on the bottom side thereof, the offset between channels 13 and 17 presents the user with a secure and comfortable grip on the table top as their thumb rests in channel 13 while one or more of their remaining four fingers rest in channel 17. This is important for a patient who does not feel well or is in a weakened state since overbed tables are heavy and pulling them towards oneself can be difficult when lying in a bed. However, with the positive grip provided by channels 13 and 17 all along the length of table top 30, a patient will be able securely and comfortably grasp the table top for the repositioning thereof. The ability of a patient to control a small part of their environment in this way is critical at a time when a patient might be feeling helpless and is facing challenging health conditions. Further, since the exposed surfaces of open channels 13 and 17 are the antimicrobial material used to fabricate the monolithic portion of the table top, microbes deposited on the surfaces of the channels are quickly eradicated.

Figure 7:
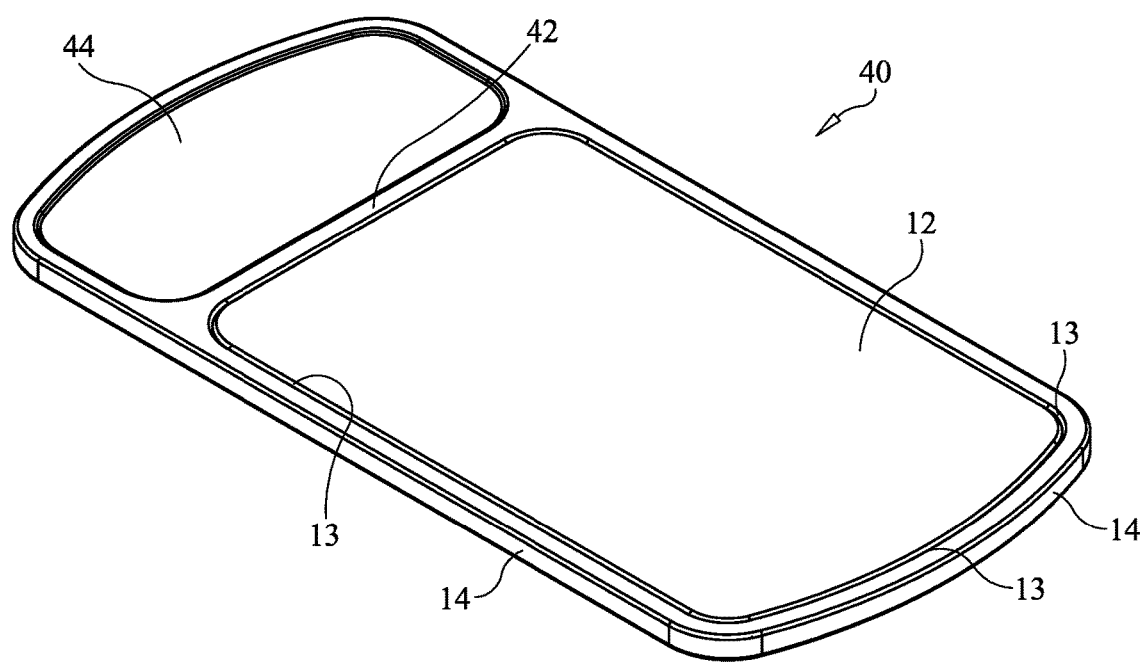
FIG. 7 is a perspective view of the top of an overbed table top in accordance with yet another embodiment of the present invention.
Figure 8:
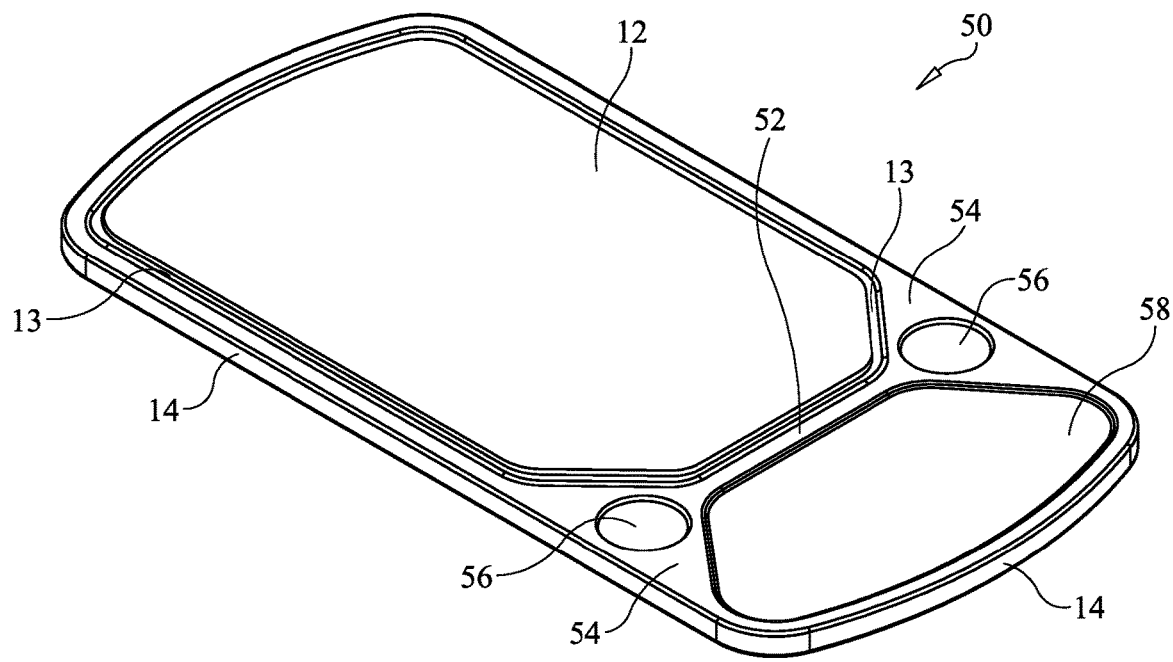
FIG. 8 is a perspective view of the top of an overbed table top in accordance with still another embodiment of the present invention.

The top portion of a table top of the present invention can include one or more partitions to create open receptacles that further enhance the table top's functionality. For example, a table top 40 illustrated in FIG. 7 includes a raised partition 42 to define an open receptacle 44 whose base is below the top's surface 12 circumvented by open channel 13. A table top 50, illustrated in FIG. 8, includes a raised partition 52 having expanded-width regions 54. Open receptacles 56 formed in expanded width regions 54 can be used to securely hold drink cups, specimen cups, medicine cups, etc. Raised partition 52 also defines an open receptacle 58 similar to previously-described open receptacle 44. Each of the table tops 40 and 50 can have a bottom configured and constructed as shown and described in FIGS. 5 and 6.

The overbed table tops of the present invention will frequently be installed on an existing design of a rolling frame/base or support that includes a spring mechanism facilitating vertical adjustment of the table top as is known in the art. The spring constants associated with the various spring mechanisms generally range between 100-155 Newtons. To allow the table top to be moved up/down with relative ease, the overall weight of the table top should be such that a ratio of weight-to-spring constant of 0.18 to 0.21 is maintained.

The advantages of the present invention are numerous. The overbed table top continuously and passively functions to eradicate a wide variety of infections to protect a patient, a health care facility's workers and caregivers, and patient visitors. The positive infection-fighting grip system will improve the patent experience, while simultaneously reducing their chance of catching an infection. The table top's mounting laminate is readily adapted to a variety of existing rolling frames/bases or supports thereby providing hospitals and health care facilities with an affordable solution in their constant battle to prevent the spread of facility-borne infections.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An overbed table top, comprising:
   a monolithic portion having a top surface, a bottom surface, and an edge surface spanning between said top surface and said bottom surface, said bottom surface including an open cavity wherein a peripheral region of said bottom surface circumscribes said open cavity, said monolithic portion being an antimicrobial material, wherein said monolithic portion has a first open channel traversing an annular path at said top surface and has at least one second open channel traversing a linear path at said peripheral region, a portion of said first open channel being offset with respect to said second open channel wherein said portion of said first open channel is closer to said edge surface than said second open channel; and
   a laminate portion disposed in said open cavity and coupled to said monolithic portion, said laminate portion including an exposed layer of a moisture impervious material coupled to a hidden layer of a wood-based material adapted to support fasteners that are adapted to attach said overbed table top to a frame.

2. An overbed table top as in claim 1, wherein said first open channel and said edge surface are concentric.

3. An overbed table top as in claim 1, further comprising a layer of an adhesive disposed between a surface of said open cavity and said hidden layer of said wood-based material.

4. An overbed table top as in claim 1, wherein said exposed layer of said moisture impervious material is co-planar with said peripheral region of said bottom surface.

5. An overbed table top as in claim 1, wherein said first open channel has a liquid volume in a range of 6 to 14 fluid ounces.

6. An overbed table top as in claim 1, wherein said top surface further includes at least one open receptacle.

7. An overbed table top, comprising:
   a monolithic portion having a top surface, a bottom surface, and an edge surface spanning between said top surface and said bottom surface, said bottom surface including an open cavity wherein a peripheral region of said bottom surface circumscribes said open cavity, said monolithic portion being an antimicrobial material, wherein said monolithic portion comprises a generally rectangular shape, wherein said peripheral region of said bottom surface includes two portions thereof that are parallel to one another, wherein said monolithic portion has a first open channel traversing an annular path at said top surface and has a second open channel traversing a linear path at each of said two portions of said peripheral region of said bottom surface, a portion of said first open channel being offset with respect to each said second open channel wherein said portion of said first open channel is closer to said edge surface than each said second open channel; and
   a laminate portion disposed in said open cavity and coupled to said monolithic portion, said laminate portion including an exposed layer of a moisture impervious material coupled to a hidden layer of a wood-based material adapted to support fasteners that are adapted to attach said overbed table top to a frame.

8. An overbed table top, comprising:
   a generally rectangular monolithic portion having a top surface, a bottom surface, and an edge surface spanning between a periphery of said top surface and a periphery of said bottom surface, said bottom surface including an open cavity wherein a peripheral region of said bottom surface circumscribes said open cavity, said monolithic portion being an antimicrobial material;
   said peripheral region of said bottom surface including two portions thereof that are parallel to one another;
   said monolithic portion having a first open channel traversing an annular path at said top surface and a second open channel traversing a linear path at each of said two portions of said peripheral region of said bottom surface, a portion of said first open channel being offset with respect to each said second open channel wherein said portion of said first open channel is closer to said edge surface than each said second open channel;
   said first open channel having a liquid volume in a range of 6 to 14 fluid ounces; and
   a laminate portion disposed in said open cavity and coupled to said monolithic portion, said laminate portion including an exposed layer of a moisture impervious material coupled to a hidden layer of a wood-based material adapted to support fasteners that are adapted to attach said overbed table top to a frame.

9. An overbed table top as in claim 8, wherein said first open channel and said edge surface are concentric.

10. An overbed table top as in claim 8, further comprising a layer of an adhesive disposed between a surface of said open cavity and said hidden layer of said wood-based material.

11. An overbed table top as in claim 8, wherein said exposed layer of said moisture impervious material is co-planar with said peripheral region of said bottom surface.

12. An overbed table top as in claim 8, wherein said top surface further includes at least one open receptacle.

13. An overbed table top, comprising:
   a generally rectangular monolithic portion having a top surface, a bottom surface, and an edge surface spanning between a periphery of said top surface and a periphery of said bottom surface, said bottom surface including an open cavity wherein a peripheral region of said bottom surface circumscribes said open cavity, said monolithic portion being an antimicrobial material;
   said peripheral region of said bottom surface including two portions thereof that are parallel to one another;
   said monolithic portion having a first open channel traversing an annular path at said top surface and two second open channels, each of said second open channels traversing a linear path at one of said two portions of said peripheral region of said bottom surface;
   portions of said first open channel being parallel to said second open channels and offset with respect thereto wherein each of said portions of said first open channel is closer to said edge surface than a nearest one of said second open channels; and
   a laminate portion disposed in said open cavity and coupled to said monolithic portion, said laminate portion including an exposed layer of a moisture impervious material coupled to a hidden layer of a wood-based material adapted to support fasteners that are adapted to attach said overbed table top to a frame.

14. An overbed table top as in claim 13, wherein said first open channel has a liquid volume in a range of 6 to 14 fluid ounces.

15. An overbed table top as in claim 13, wherein said first open channel and said edge surface are concentric.

16. An overbed table top as in claim 13, further comprising a layer of an adhesive disposed between a surface of said open cavity and said hidden layer of said wood-based material.

17. An overbed table top as in claim 13, wherein said exposed layer of said moisture impervious material is co-planar with said peripheral region of said bottom surface.

18. An overbed table top as in claim 13, wherein said top surface further includes at least one open receptacle.

* * * * *